United States Patent [19]
de Nora et al.

[11] Patent Number: 6,139,704
[45] Date of Patent: Oct. 31, 2000

[54] APPLICATION OF REFRACTORY BORIDES TO PROTECT CARBON-CONTAINING COMPONENTS OF ALUMINUM PRODUCTION CELLS

[75] Inventors: Vittorio de Nora, Nassau, Bahamas; Jainagesh A. Sekhar, Cincinnati, Ohio

[73] Assignee: Moltech Invent S.A., Luxembourg, Luxembourg

[21] Appl. No.: 09/236,260

[22] Filed: Jan. 22, 1999

Related U.S. Application Data

[62] Continuation of application No. 08/706,372, Aug. 30, 1996, which is a continuation of application No. 08/290,923, filed as application No. PCT/US93/05142, May 28, 1993, Pat. No. 5,651,874, which is a continuation-in-part of application No. 07/898,052, Jun. 12, 1992, Pat. No. 5,364,513, and application No. 07/861,513, Apr. 1, 1992, Pat. No. 5,310,476.

[51] Int. Cl.[7] ............................................. C25C 3/08
[52] U.S. Cl. ..................... 204/244; 204/245; 204/247; 204/247.3; 204/247.4; 204/290 R; 204/294
[58] Field of Search ............................ 204/245, 290 R, 204/247.3, 247.4, 244, 294

[56] References Cited

U.S. PATENT DOCUMENTS

| | | | |
|---|---|---|---|
| 4,405,433 | 9/1983 | Payne | 204/243.3 X |
| 4,602,990 | 7/1986 | Boxall et al. | 204/247.3 |
| 4,622,111 | 11/1986 | Brown et al. | 204/247.4 X |
| 5,286,353 | 2/1994 | Wilkening | 204/247.4 X |
| 5,286,359 | 2/1994 | Richards et al. | 204/247.3 |

*Primary Examiner*—Donald R. Valentine
*Attorney, Agent, or Firm*—Jayadeep F. Deshmukh

[57] ABSTRACT

Carbon-containing components of cells for the production of aluminium by the electrolysis of alumina dissolved in a cryolite-based molten electrolyte are protected from attack by liquid and/or gaseous components of the electrolyte in the form of elements, ions or compounds, by a refractory boride coating applied from a slurry composed of pre-formed particulate refractory boride in a colloidal carrier which is dried and heated to consolidate the coating.

41 Claims, 3 Drawing Sheets

APPLICATION OF REFRACTORY BORIDES TO PROTECT CARBON-CONTAINING COMPONENTS OF ALUMINUM PRODUCTION CELLS

CROSS REFERENCE TO RELATED APPLICATIONS

This application is a continuation of application Ser. No. 08/706,372, filed Aug. 30, 1996, still pending which is a continuation of application Ser. No. 08/290,923 filed Sep. 14, 1994 (now U.S. Pat. No. 5,651,874), which is a national stage of PCT/US93/05142 filed May 28, 1993, which is a continuation-in-part of application Ser. No. 07/898,052, filed Jun. 12, 1992 (now U.S. Pat. No. 5,364,513) and of Ser. No. 07/861,513, filed Apr. 1, 1992 (now U.S. Pat. No. 5,310,476).

TECHNICAL FIELD

The invention relates to the application of refractory borides to carbon-based components of cells for the production of aluminium by electrolysis of alumina dissolved in a cryolite-based molten electrolyte, in particular carbon cathodes. The invention also relates to such cells having carbon-based components protected from the corrosive attacks of liquids and/or gaseous components of the electrolyte in the form of elements, ions or compounds by having refractory borides applied to their surfaces, as well as the use of these cells for the production of aluminium.

BACKGROUND ART

Aluminium is produced conventionally by the Hall-Héroult process, by the electrolysis of alumina dissolved in cryolite-based molten electrolytes at temperature up to around 950° C. A Hall-Héroult reduction cell typically has a steel shell provided with an insulating lining of refractory material, which in turn has a lining of carbon which contacts the molten constituents. Conductor bars connected to the negative pole of a direct current source are embedded in the carbon cathode substrate forming the cell bottom floor. The cathode substrate is usually an anthracite based carbon lining made of prebaked cathode blocks, joined with a ramming mixture of anthracite, coke, and coal tar.

In Hall-Héroult cells, a molten aluminium pool acts as the cathode. The carbon lining or cathode material has a useful life of three to eight years, or even less under adverse conditions. The deterioration of the cathode bottom is due to erosion and penetration of electrolyte and liquid aluminium as well as intercalation of sodium, which causes swelling and deformation of the cathode carbon blocks and ramming mix. In addition, the penetration of sodium species and other ingredients of cryolite or air leads to the formation of toxic compounds including cyanides.

Difficulties in operation also arise from the accumulation of undissolved alumina sludge on the surface of the carbon cathode beneath the aluminium pool which forms insulating regions on the cell bottom. Penetration of cryolite and aluminium through the carbon body and the deformation of the cathode carbon blocks also cause displacement of such cathode blocks. Due to displacement of the cathode blocks, aluminium reaches the steel cathode conductor bars causing corrosion thereof leading to deterioration of the electrical contact, non uniformity in current distribution and an excessive iron content in the aluminium metal produced.

A major drawback of carbon as cathode material is that it is not wetted by aluminium. This necessitates maintaining a deep pool of aluminium (at least 100–250 mm thick) in order to ensure a certain protection of the carbon blocks and an effective contact over the cathode surface. But electromagnetic forces create waves in the molten aluminium and, to avoid short-circuiting with the anode, the anode-to-cathode distance (ACD) must be kept at a safe minimum value, usually 40 to 60 mm. For conventional cells, there is a minimum ACD below which the current efficiency drops drastically, due to short-circuiting between the aluminium pool and the anode. The electrical resistance of the electrolyte in the inter-electrode gap causes a voltage drop from 1.8 to 2.7 volts, which represents from 40 to 60 percent of the total voltage drop, and is the largest single component of the voltage drop in a given cell.

To reduce the ACD and associated voltage drop, extensive research has been carried out with Refractory Hard Metals or Refractory Hard Materials (RHM) such as $TiB_2$ as cathode materials. $TiB_2$ and other RHM's are practically insoluble in aluminium, have a low electrical resistance, and are wetted by aluminium. This should allow aluminium to be electrolytically deposited directly on an RHM cathode surface, and should avoid the necessity for a deep aluminium pool. Because titanium diboride and similar Refractory Hard Metals are wettable by aluminium, resistant to the corrosive environment of an aluminium production cell, and are good electrical conductors, numerous cell designs utilizing Refractory Hard Metal have been proposed, which would present many advantages, notably including the savings of energy by reducing the ACD.

The use of titanium diboride and other RHM current-conducting elements in electrolytic aluminium production cells is described in U.S. Pat. Nos. 2,915,442, 3,028,324, 3,214,615, 3,314,876, 3,330,756, 3,156,639, 3,274,093 and 3,400,061. Despite extensive efforts and the potential advantages of having surfaces of titanium diboride at the cell cathode bottom, such propositions have not been commercially adopted by the aluminium industry.

The non-acceptance of tiles and other methods of applying layers of $TiB_2$ and other RHM materials on the surface of aluminium production cells is due to their lack of stability in the operating conditions, in addition to their cost. The failure of these materials is associated with penetration of the electrolyte when not perfectly wetted by aluminium, and attach by aluminium because of impurities in the RHM structure. In RHM pieces such as tiles, oxygen impurities tend to segregate along grain boundaries leading to rapid attack by aluminium metal and/or by cryolite. To combat disintegration, it has been proposed to use highly pure $TiB_2$ powder to make materials containing less than 50 ppm oxygen. Such fabrication further increases the cost of the already-expensive materials. No cell utilizing $TiB_2$ tiles as cathode is known to have operated for long periods without loss of adhesion of the tiles, or their disintegration. Other reasons for failure of RHM tiles have been the lack of mechanical strength and resistance to thermal shock.

Various types of $TiB_2$ or RHM layers applied to carbon substrates have failed due to poor adherence and to differences in thermal expansion coefficients between the titanium diboride material and the carbon cathode block.

U.S. Pat. No. 4,093,524 discloses bonding tiles of titanium diboride and other Refractory Hard Metals to a conductive substrate such as graphite. But large differences in thermal expansion coefficients between the RHM tiles and the substrate cause problems.

Application Ser. No. 08/028,359, filed Mar. 9, 1993, now U.S. Pat. No. 5,320,717 the content whereof is incorporated herein by way of reference, provides a method of bonding bodies of Refractory Hard Material (RHM) or other refractory composites to carbon cathodes of aluminium protection cells using a colloidal slurry comprising particulate preformed RHM in a colloidal carrier selected from colloidal alumina, colloidal yttria and colloidal ceria as a glue between the bodies and the cathode or other component. The slurry is dried to bond the bodies to the cathode or other component, the dried slurry acting as a conductive thermally-matched glue which provides excellent bonding of the bodies to the cathode or other component.

PCT application PCT/EP93/00811 discloses a method or producing a protective refractory coating on a substrate of, inter-alia, carbonaceous materials by applying to the substrate a micropyretic reaction layer from a slurry containing particulate reactants in a colloidal carrier, and initiating a micropyretic reaction. The micropyretic slurry optionally also contains some preformed refractory material, and the micropyretic slurry may be applied on a non-reactive sublayer.

PCT application PCT/EP93/00810 discloses a body of carbonaceous or other material for use in corrosive environments such as oxidising media or gaseous or liquid corrosive agents at elevated temperatures, coated with a protective surface coating which improves the resistance of the body to oxidation or corrosion and which may also enhance the bodies electrical conductivity and/or its electrochemical activity. This protective coating—in particular silica-based coatings—is applied from a colloidal slurry containing particulate reactant or non-reactant substances, or a mixture of particulate reactant and non-reactant substances, which when the body is heated to a sufficient elevated temperature form the protective coating by reaction sintering and/or sintering without reaction.

DISCLOSURE OF THE INVENTION

The invention aims to overcome the deficiencies of past attempts to utilize refractory materials in particular refractory borides as surface coatings on carbonaceous substrates, for protecting the substrates from the corrosive attacks of liquids and gases when used as cell components for aluminium production cells, especially for use as cathodes.

An object of the invention is to provide refractory boride coatings that are well adherent to the carbon-containing substrates, provide the required protection to the cell components and have the desired mechanical, physical, chemical, and electrochemical characteristics.

A further object is to provide coatings which are adherent to the carbon-containing substrates and protect the substrates efficiently from the corrosive attacks of liquids, fumes and gases existing or produced in aluminum production cells wherein all cell components have to be mechanically strong at the operating temperature and each one may have any additional required characteristic.

A specific object of the invention is to provide an easy-to-implement method of applying refractory borides to carbon-containing cell components to form a coating which can be consolidated by heat treatment before or during use of the cell component to improve its protection, which method employs refractory borides in a readily-available form.

In particular, an aluminium-wettable, refractory, electrically conductive, adherent boride coating has been developed to be applied to the surface of the cell cathode bottom made of carbonaceous material to protect such carbonaceous material from the attack of sodium and air which produces deformation of the cathode blocks and formation of dangerous nitrogen compounds such as cyanides.

By protecting the carbonaceous cell components from attack by NaF or other aggressive ingredients of the electrolyte, the cell efficiency is improved. Because NaF in the electrolyte no longer reacts with the carbon cell bottom and walls, the cell functions with a defined bath ratio without a need to replenish the electrolyte with NaF.

The aluminum-wettable refractory boride coating will also permit the elimination of the thick aluminium pool required to partially protect the carbon cathode, enabling the cell to operate with a drained cathode. Other coatings have been developed to protect the upper part of the carbonaceous cell wall and cell cover and anode current feeders and holders from the attack of fluoride fumes and oxidation by oxygen or air and the lower part from the attack by the cryolite-containing electrolyte (see in particular PCT application PCT/EP90/00810).

The protective effect of the coatings according to the invention is such as to enable the use of relatively inexpensive carbon-containing materials for the substrates. For instance, cheaper grades of graphite can be used instead of the more expensive anthracite forms of carbon, while providing improved resistance against the corrosive conditions in the cell environment.

The refractory boride coatings have the following attributes: excellent wettability by molten aluminium, excellent adherence to the carbon-containing substrates, inertness to attack by molten aluminium and cryolite, low cost, enviromnentally safe, ability to absorb thermal and mechanical shocks without delamination from the anthracite-based carbon or other carbonaceous substrates, durability in the environment of an aluminium production cell, and ease of application and processing. The preferred coatings furthermore have a controlled microporosity and degree of penetration in the porous carbonaceous substrate, by having an adequate distribution of the particle sizes of the preformed refractory boride.

When these refractory boride coatings are applied to a carbon-based substrate, for instance of graphite or anthracite-based carbon used in an aluminium production cell in contact with the molten electrolyte and/or with molten aluminium, the coating protects the substrate against the ingress of cryolite and sodium and is in turn protected by the protective film of aluminium on the coating itself.

The refractory boride coatings find many applications on account of their excellent resistance, protection, and stability when exposed to the corrosive action of liquids and fumes existing in the cell or formed during electrolysis even when the temperature of operation is low as in the Low Temperature electrolysis process for the production of aluminium (see for example U.S. Pat. No. 4,681,671 and PCT application PCT/EP92/02666).

THE COLLOIDAL SLURRY

One main aspect of the invention is a slurry for the application of refractory hard metal boride to carbon-containing components of cells for the production of aluminium by the electrolysis of alumina dissolved in a cryolite-based molten electrolyte, to protect such components from attack by liquid and/or gaseous components of the electrolyte in the form of elements, ions or compounds, wherein the slurry is composed of pre-formed particulate refractory boride in a colloidal carrier.

It is essential to use colloids and mixtures of colloids for application of the coatings. Three types of colloidal processing are possible. The first involves the gelation of certain polysaccharide solutions. This, however, is relatively unimportant to this invention. The other two which involve colloids and metal organic compounds are relevant to this invention. These two involve the mixing of materials in a very fine scale. Colloids are defined as comprising a dispersed phase with at least one dimension between 0.5 nm (nanometer) and about 10 micrometers in a dispersion medium which in our case is a liquid. The magnitude of this dimension distinguishes colloids from bulk systems in the following way: (a) an extremely large surface area and (b) a significant percentage of molecules reside in the surface of colloidal systems. Up to 40% of molecules may reside on the surface. The colloidal systems which are important to this invention are both the thermodynamically stable lyophylic type (which include macromolecular systems such as polymers) and the kinetically stable lyophobic type (those that contain particles).

Insoluble oxides in aqueous suspension develop surface electric charges by surface hydroxylation followed by dissociation of surface hydroxyl groups. Typical equations could be:

M(OH) surface+$H_2O$⇌$MO^-$ surface+$H_3O^+$

M(OH) surface+$H_2O$⇌$M(OH_2)^+$ surface+$OH^-$ where M represents a metal or a complex cation.

Such surface charges and the London and Ven der Waals forces keep the particles from agglomerating. An adsorbed layer of material, polymer or surface active agent, modifies the interaction of particles in several ways. In the mixing process described below, we introduce particulate preformed refractory borides.

Colloids may form through cation hydrolysis. Many metal ions are subject to hydrolysis because of high electronic charge or charge density. Initial products of hydrolysis can condense and polymerize to form polyvalent metal or polynuclear ions, which are themselves colloidal. Charge and pH determine the ligands for central cations and the anion/cation ratio controls the degree of polymerization and stability of the suspension. The pH could vary from 0–14. A wide range of polynuclear cationic hydrolysis products may exist with charge from 2+ to 6+. Polynuclear anionic hydrolysis products could also have a wide range of charges.

The formation of colloids involves a starting material for example a reagent grade metal salt which is converted in a chemical process to a dispersible oxide which forms the colloidal solution on addition of dilute acid or water. Removal of water (drying) and/or removal of the anions from the colloidal solution produces a gel like product.

The colloidal carrier—usually colloidal alumina, silica, yttria, ceria, thoria, zirconia, magnesia, lithia, monoaluminium phosphate or cerium acetate, and usually in an aqueous medium—has been found to considerably improve the properties of the coating produced by non-reactive sintering.

The colloidal slurry contains particulate pre-formed refractory hard metal boride(s). Above 900° C., sintering or consolidation may occur during exposure to the service conditions at the high temperature.

The constituents of the slurries are:
(a) A carrier, chosen from colloidal liquids which could be colloidal alumina, silica, yttria, ceria, thoria, zirconia, magnesia, lithia, monoaluminium phosphate, cerium acetate or mixtures thereof.
(b) A powder additive containing pre-formed refractory borides.

The colloid may be derived from colloid precursors and reagents which are solutions of at least one salt such as chlorides, sulfates, nitrates, chlorates, perchlorates or metal organic compounds such as alkoxides, formates, acetates of aluminium, silicon, yttrium, cerium, thorium zirconium, magnesium and lithium. These colloid precursors or colloid reagents can contain a chelating agent such as acetyl acetone or ethylacetoacetate. The aforesaid solutions of metal organic compounds, principally metal alkoxides, can be of the general formula $M(OR)_z$ where M is a metal or complex cation, R is an alkyl chain and z is a number, preferably from 1 to 12.

The pre-formed particulate refractory boride is selected from borides of titanium, chromium, vanadium, zirconium, hafnium, niobium, tantalum, molybdenum and cerium. The preferred particulate refractory boride is titanium diboride.

When choosing powder additives the particle size selection is of importance. It is preferable to choose particle size below 100 micrometers and to choose particle sizes which are varied such that the packing of particles is optimized. For example it is preferable to choose particle sizes extending over a range where the smallest particles are at least two times and preferably at least three times smaller than the large ones. Generally, the ratio of the particle sizes will be in the range from 2:1 to 15:1, usually from about 3:1 to 10:1, for instance a ratio of about 3:1 with large particles in the range 15 to 30 micrometers and small particles in the range 5 to 10 micrometers, or a ratio of about 10:1 with large particies in the range from 30 to 50 micrometers and small particles in the range from 3 to 5 micrometers. Usually, the preformed particulate metal boride has particles with sizes in the range from about 3 micrometers to about 50 micrometers.

The slurry usually contains 5–100 g of the preformed particulate refractory boride per 10 ml of colloid and the colloid has a dry colloid content corresponding to up to 50 weight % of the colloid plus liquid carrier, preferably from 10 to 20 weight %.

The colloid is contained in a liquid such as water which may further contain at least one compound selected from compounds of lithium, aluminum, cerium, sodium and potassium, for instance at least one compound of lithium and at least one compound of aluminum, see application Ser. No. 08/034,283 filed Mar. 22, 1993, now U.S. Pat. No. 5,397,450, the contents whereof are incorporated herein by way of reference.

METHOD OF PRODUCTION

Another aspect of the invention is a method of protecting carbon-containing cathodes from the attack of cryolite, molten aluminum and sodium by applying a coating of colloids containing $TiB_2$ or other refractory hard metal borides.

The invention provides a method of applying a refractory hard metal boride to a carbon-containing component of a cell for the production of aluminum, in particular by the electrolysis of alumina dissolved in a cryolite-based molten electrolyte, this method comprising applying to the surface of the component a slurry of particulate preformed refractory boride in a colloidal carrier as specified above, followed by drying, and by heat treatment before or after the component is installed in an aluminum production cell.

The method of application of the slurry involves painting (by brush or roller), dipping, spraying, or pouring the slurry onto the substrate and allowing for drying before another layer is added. The coating need not entirely dry before the application of the next layer. It is preferred to heat the coating with a suitable heat source so as to completely dry it and improve densification of the coating. Heating takes place preferably in air but could be in other oxidizing atmospheres or in inert or reducing atmospheres. A heat treatment in air at about 80–200° C., for half an hour to several hours is usually sufficient.

The substrate may be treated by sand blasting or pickled with acids or fluxes such as cryolite or other combinations of fluorides and chlorides prior to the application of the coating. Similarly the substrate may be cleaned with an organic solvent such as acetone to remove oily products and other debris prior to the application of the coating. These treatments will enhance the bonding of the coatings to the carbon-containing substrate.

After coating the substrate by dipping, painting or spraying the slurry or combinations of such techniques in single or multi-layer coatings and drying, a final coat of the colloid alone may be applied lightly prior to use.

More generally, before or after application of the coating and before use, the body can be painted, sprayed, dipped or infiltrated with reagents and precursors, gels and/or colloids. For instance, before applying the slurry of particulate refractory boride in the colloidal carrier the carbonaceous component can be impregnated with e.g. a compound of lithium to improve the resistance to penetration by sodium, as described in application Ser. No. 08/028,384 filed Mar. 9, 1993, now abandoned, the contents whereof are incorporated herein by way of reference.

To assist rapid wetting of the components by molten aluminum, the refractory material coated on the substrate may be exposed to molten aluminum in the presence of a flux assisting penetration of aluminum into the refractory material, the flux for example comprising a fluoride, a chloride or a borate, of at least one of lithium and sodium, or mixtures thereof. Such treatment favors aluminization of the refractory coating by the penetration therein of aluminum.

The substrate of the component may be coated outside the aluminum production cell and the coated component than inserted into the cell. Alternatively, the component is part of a cell which is coated in the cell prior to operation. For instance, the component is part of a cell bottom formed by an exposed area of carbonaceous material. In this case, the slurry is preferably applied to the cell bottom in several layers with drying of each successive layer and final drying by means of a mobile heat source.

More generally, the invention also concerns a method of improving the resistance to oxidation or corrosion of a body of carbonaceous material for use in corrosive environments such as oxidizing media or gaseous or liquid agents at elevated temperatures, the body being in particular a component of an electrochemical cell for the production of aluminum, in particular by the electrolysis of alumina dissolved in a cryolite-based molten electrolyte, which component in use is exposed to a corrosive atmosphere, or to cryolite and/or to a product of electrolysis in the cell. This method comprises applying to the body a protective coating from a slurry of the preformed refractory boride in a colloidal carrier, followed by heating the body prior to or during use to a sufficient temperature to cause the boride to consolidate to form an adherent protective coating.

CELL COMPONENTS

The invention also concerns cell components of aluminum production cells, in particular those which in use of the cell are exposed to contact with molten cryolite and/or molten aluminum. The cell component is for instance a cathode or forms part of a cathodic cell bottom.

Other cell components are those which in use are exposed to corrosive or oxidizing gas released in operation of the cell or present in the cell operating conditions, which components are protected from corrosion or oxidation by the refractory boride coating as set out above.

According to the invention, there is provided a carbon-containing component of a cell for the production of aluminum by the electrolysis of alumina dissolved in a cryolite-based molten electrolyte, which cell component is protected from attack by liquid and/or gaseous components of the electrolyte in the form of elements, ions or compound, by a coating of preformed particulate refractory hard metal boride in a dried colloid applied on the cell component from a slurry of the preformed particulate refractory hard metal boride in a colloidal carrier, as set out above.

The component may be current-carrying component for example a cathode, a cathode current feeder, an anode or an anode current feeder. Or the component may be a bipolar electrode coated on its cathode face, or on its anode face, or both.

The slurry-applied refractory boride coatings may have a thickness from about 150 micrometers to about 1500 micrometers, usually from about 200 to about 500 micrometers, depending on the number of applied layers, the particle size of the preformed boride, and the porosity of the carbon. Advantageously, by using graded boride particles including fine particles, the smaller boride particles penetrate into the pores of the carbon component and firmly anchor the coating. Typically, the boride may impregnate the carbon to a depth of about 50–200 micrometers. The colloid impregnates the carbon component so the dried colloid is dispersed through the carbon component.

The invention concerns in general the protection of components of electrochemical cells for the production of aluminum by the electrolysis of alumina dissolved in a cryolite-based molten electrolyte, which components in use are exposed to a corrosive atmosphere, or to a molten cryolite, and/or to a product of electrolysis in the cell. Such components are coated with a protective surface coating which improves the resistance of the components to oxidation or corrosion and which may also enhance the electrical conductivity and/or electrochemical activity. The protective coating is applied from a colloidal slurry containing particulate preformed refractory boride and dried. When the component is heated to a sufficient elevated temperature, prior to or upon insertion in the cell, a protective coating in formed by sintering or consolidation without reaction.

The invention also concerns a component of an aluminum production cell which is use is subjected to exposure to molten cryolite and/or to molten aluminum or corrosive fumes or gases, the component comprising a substrate of a carbonaceous material, coated with a refractory boride, of at least one of titanium, chromium, vanadium, zirconium, hafnium, niobium, tantalum, molybdenum and cerium or mixtures thereof, finely mixed with a refractory compound of at least one alumina, silica, yttria, ceria, thoria, zirconia, magnesia and lithia from a dried colloid.

The component is usually made of carbonaceous material selected from petroleum coke, metallurgical coke, anthracite, graphite, amorphous carbon, fulerene, low density carbon or mixtures thereof. Composite materials based on one or more of these forms of carbon with other materials may also be employed.

It is advantageous for the component to have a substrate of low-density carbon protected by the refractory boride, for example if the component is exposed to oxidizing gas released in operation of the cell, or also when the substrate is part of a cell bottom. Low density carbon embraces various types of relatively inexpensive forms of carbon which are relatively porous and very conductive, but hitherto could not be used successfully in the environment of aluminum production cells on account of the fact that they were subject to excessive corrosion or oxidation. Now it is possible by coating these low density carbons according to the invention, to make use of them in these cells instead of the more expensive high density anthracite and graphite, taking advantage of their excellent conductivity and low cost.

The substrate may consist of carbonaceous blocks that can be fitted together to form a cell bottom of an aluminum production cell, or packed carbonaceous particulate material forming a cell bottom, which acts to carry current to the cathodic pool if there is one, or to a thin layer of aluminum through the refractory boride coating in drained cells.

The component advantageously forms part of a cathode which the electrolysis current flows, the refractory boride coating forming a cathodic surface in contact with the cathodically-produced aluminum. For example, it is part of a drained cathode, the refractory boride coating forming the cathodic surface on which the aluminum is deposited cathodically, and the component being arranged usually upright or at a slope for the aluminum to drain from the cathodic surface.

ELECTROLYTIC CELLS AND OPERATION

The invention also relates to an aluminum production cell comprising a coated component as discussed above as well as a method of producing aluminum using such cells and methods of assembling and/or operating the cells.

Such cells may comprise a component which in operation of the cell is exposed to molten cryolite or aluminum, said component comprising a substrate of carbonaceous material and a coating of refractory boride, applied from a colloidal slurry as discussed above, wherein the product aluminum is in contact with the refractory boride coating on the component, which may be a cathode or forms part of a cathodic cell bottom.

The invention also concerns an aluminum production cell having a component which in operation of the cell is exposed to corrosive or oxidizing gas released in operation of the cell or present in the cell operating conditions, said component comprising a substrate of carbonaceous material, and a coating of refractory boride deposited from a colloidal slurry, as discussed above.

A method of operating the cells comprises:
producing a cell component which comprises a substrate of carbonaceous material and a protective coating of refractory boride, by applying to the substrate a slurry containing particulate preformed refractory boride in a colloidal carrier drying and optionally subjecting the component to heat treatment;
placing the coated component in the cell so the coating of refractory material will be contacted by the cathodically produced aluminum, and/or the molten electrolyte, and/or the anodically-released gases; and
operating the cell with the coating protecting the substrate from attack by the cathodically-produced aluminum, by the molten electrolyte and by the anodically-released gases with which it is in contact.

Operation of the cell is advantageously in a low temperature process, with the molten halide electrolyte containing dissolved alumina at a temperature below 900° C., usually at a temperature from 680° C. to 880° C. The low temperature electrolyte may be a fluoride melt, a mixed fluoride-chloride melt or a chloride melt.

This low temperature process is operated at low current densities on account of the low alumina solubility. This necessitates the use of large anodes and corresponding large cathodes, exposing large areas of these materials to the corrosive conditions in the cell, such large exposed areas being well protected by the refractory coatings according to the invention which are just as advantageous at these lower temperatures.

BRIEF DESCRIPTION OF DRAWINGS

The invention will now be described with reference to the application of coatings to components of electrolytic cells for the production of aluminum, especially for novel designs of these cells, as illustrated in the accompanying drawings, wherein.

MODES FOR CARRYING OUT THE INVENTION

Figure 1:
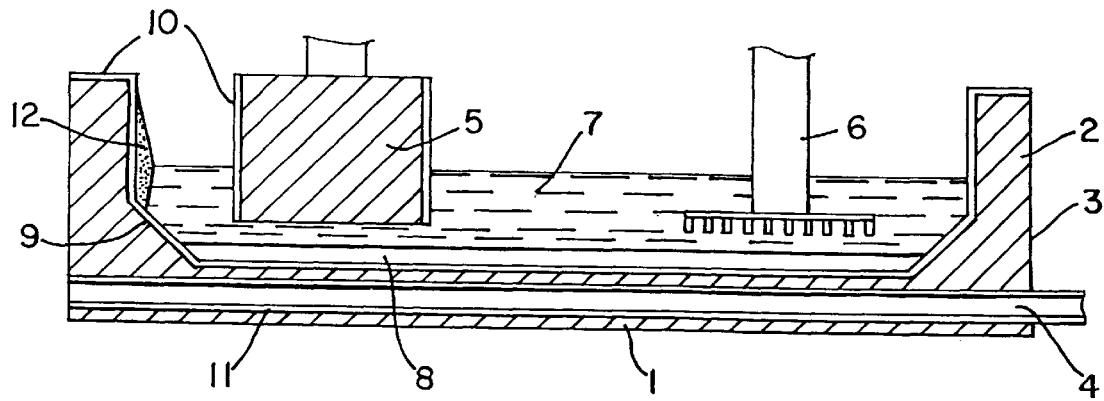
FIG. 1 schematically shows an aluminum production cell with a carbon bottom and lower cell wall lining coated in accordance with the invention.

FIG. 1 schematically shows a Hall-Héroult aluminum production cell of conventional design that has been modified by providing the cell bottom with a coating of refractory aluminum wettable material in accordance with the invention, the upper part of the cell wall with a coating 10 to resisting oxidation and the lower part with a coating 9 particularly resistant to cryolite. The cell comprises a cell bottom 1 and side walls 2 of carbon enclosed in a steel lining 3. The cell bottom 1 and side walls 2 are made of blocks of anthracite-based carbon packed together and bonded by a carbon-based ramming paste. Through the bottom 1 extend steel current feeder bars 4 connected externally to a negative bus bar. To protect the cathode current feeder bars 4 from aluminum, an aluminum-resistant coating 11 is applied on their surfaces in accordance with the invention.

Several anodes 5, conventionally blocks of prebaked carbon, are suspended in the cell by the usual mechanisms (not shown) enabling their height to be adjusted. Oxygen evolving non-carbon anodes 6 may be suspended in the cell instead of the carbon anodes 5 but do not need to be vertically adjustable because they are non-consumable. The anodes 5 and 6 dip in a molten electrolyte 7, usually a cryolite-based melt containing dissolved alumina, and which floats above a pool or thin layer 8 of molten aluminum on the cell bottom. In operation, the cryolite-based electrolyte 7 is usually at a temperature of about 950° C., but the invention applies also to components used in cells with electrolytes well below 900° C., and as low as 700° C.

According to the invention, the top surface of the carbon cell bottom 1, i.e. the entire flat top surface and at least the lower parts of the inclined side walls liable to be exposed to the molten aluminum 8, is coated with a slurry-applied adherent coating 9 of an aluminum-wettable refractory boride, preferably titanium diboride, and the carbon is impregnated with dried colloids such as alumina, ceria, yttria and/or silica. This coating 9 can extend to just above the maximum level of the aluminum 8, all the way up the side walls, or up to the crust 12 of solidified electrolyte, if there is one. If required, a titanium diboride coating can be used to protect the carbon from attack by the cryolite, and a different coating 10 can be provided on the upper part of the side walls to protect the carbon from oxidation and the fluoride fumes.

The presence of the aluminium-wettable coating 9 means that the cell can be operated with a relatively shallow layer 8 of molten aluminium and the anodes 5 or 6 can be held with a small and constant gap of about 20–30 mm above the aluminium layer 8. This reduced anode-cathode distance leads to a substantial reduction in the voltage drop through electrolyte 7, and less heat dissipation during operation. It may thus be possible to operate the cell without the usual crust of solidified electrolyte around the periphery (especially when non-consumable anodes 6 are used) or at least with a much smaller crust, indicated by 12.

The aluminium-wettable coating 9 can be applied directly to a new, unused or re-built cell bottom 1, or can be applied to a used cell bottom 1 after emptying the cell of its molten contents for servicing, and machining the top surface of the cell bottom 1 to remove damaged or reacted parts and generally to renew the exposed surface.

To produce the aluminium-wettable coating 9 and the other coatings 10 and 11, several layers of a slurry of preformed particulate refractory boride in a colloidal carrier, as hereinbefore or as hereinafter described in detail, are applied for instance by brushing the slurry onto the surface, with drying between the application of successive layers. After application of the final layer, the coating is dried using a suitable mobile heat source, for example at about 100–200° C. for several minutes to about half an hour.

After drying of the aluminium-wettable coating 9, the cell can be started with one of the usual methods by filling with electrolyte and aluminium and raising the temperature to the operating temperature, e.g. by the usual means of passing current from the anodes 5 or 6 to the cell bottom 1 with an adequate anode-cathode distance. This heating to operating temperature further consolidates the boride coating 9.

The excellent and permanent wetting of the carbon cell bottom 1 by the aluminium-wettable coating 9 means that: during operation the cell bottom 1 is protected against unwanted reactions with components of the electrolyte 7, the cell can operate with a drained cathode, the anode-cathode gap can be decreased, and no sludge or muck can come to settle between the aluminium layer 8 and the cell bottom 1. The operating efficiency is thus enhanced, the energy consumption decreased, the useful lifetime of the cell bottom is extended and there is considerably less toxic material to be disposed of when the cell bottom must be serviced. As a result, aluminium can be produced in a cell coated according to the invention at substantially lower cost than in a non-coated cell of the prior art.

Figure 2:
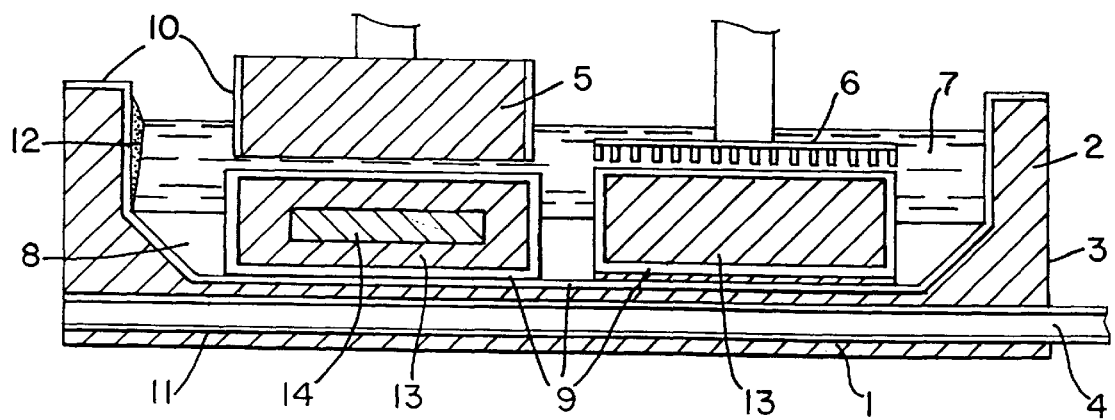
FIG. 2 schematically shows another aluminum production cell in which coated carbon cathode bodies according to the invention have been placed on the cell bottom in a pool of molten aluminum.

The cell shown in FIG. 2 has a carbon cell bottom 1 and side walls 2 enclosed is a steel shell 3, and cathode current feeders 4 in the cell bottom 1, as in FIG. 1. On the carbon cell bottom 1, the cell of FIG. 2 is fitted with blocks 13 of pre-baked carbon whose entire external surfaces are coated with the aluminium-wettable coating 9. As illustrated in the left hand part of FIG. 2, these blocks 13 may have internal inserts 14 of cast iron or another heavy material which acts as ballast so that the blocks 13 sink in the electrolyte 7 and in the aluminium layer 8, and rest firmly on cell bottom 1. Or, as illustrated in the right hand part of FIG. 2, the blocks 13 may be secured to the cell bottom by any convenient means, such as by reaction bonding or by mechanical means.

In use, the anodes 5 or 6 are suspended with their flat lower facing the corresponding upper flat surfaces of the aluminium-wettable coating 9 on blocks 13, with a relatively small and constant anode-cathode gap of about 25–35 mm. The upper flat surface of the aluminium-wettable coating 9 acts as a drained cathode, from which a film of cathodically produced aluminium is constantly drained into the pool 8 of molten aluminium. The level of pool 8 may fluctuate from close to the cell bottom 1 up to adjacent the upper flat surfaces of the aluminium-wettable coating 9 of blocks 13, whereby the product aluminium may be tapped off periodically in the usual way.

The blocks 13 may have any convenient height depending on the desired operating configuration, in particular so that the anodes 5 or 6 can be maintained close to the minimum height that they would have in conventional operation, i.e. before the blocks 13 were fitted. For instance, the height of the blocks 13 may be from 150–300 mm.

It is also possible to suspend the blocks 13 from the anodes 5 or 6 by attachments made of non-electrically conductive materials that are resistant to the electrolyte, for example aluminium nitride or nickel sub-oxides or alumina when the cell is operated at low temperature, which attachments also serve as spacers maintaining the desired small anode gap. In this way, the cathode blocks 13 can be removed from the cell with the anodes 5 or 6 for periodic servicing or replacement.

As a modification of the embodiment of FIG. 2, the pool 8 of molten aluminium could contain a packed or loose bed of pieces of carbon with internal ballast whose surfaces are coated with a permanent aluminium-wettable coating 9 in accordance with the invention. Such pieces, which may be of random shapes or regular shapes such as rings, form a bed which inhibits wave motion in the molten aluminium pool 8 and thereby enables operation with a reduced anode-cathode distance, as explained in U.S. Pat. No. 4,552,630.

Figure 3:
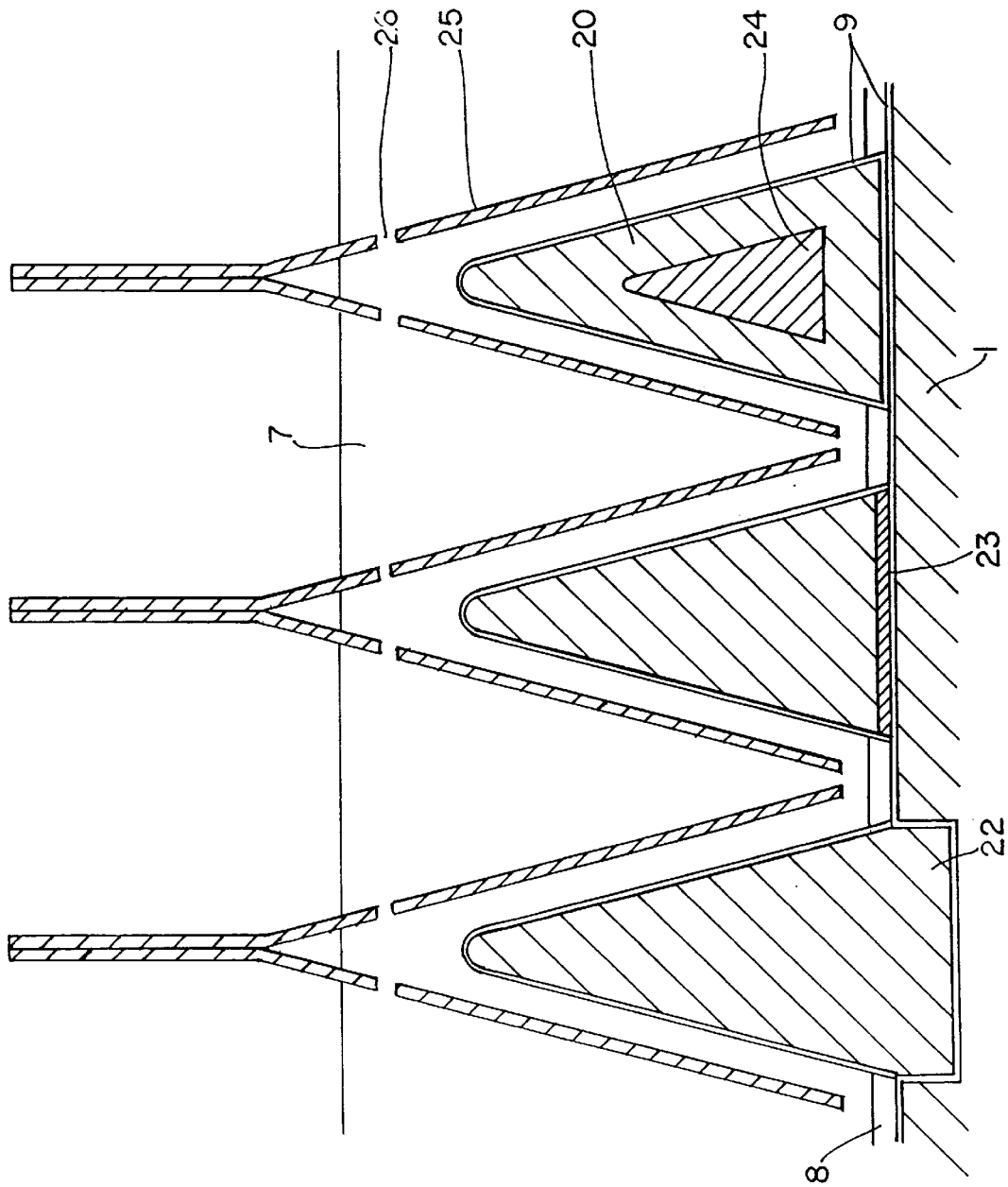
FIG. 3 schematically shows a novel aluminum production cell in which carbon cathode bodies having a wedge form and coated according to the invention have been secured on the cell bottom, and cooperate with inclined anodes.

FIG. 3 shows another anode-cathode configuration which can be fitted in a conventional aluminium production cell like that of FIG. 1, or in a cell of new design.

In this design, carbon prisms or wedges 20 are fitted on a carbon cell bottom 1, for instance by having bottom parts 22 embedded in the cell bottom, by being bonded by a layer 23 to the cell bottom when the cell is being built or reconstructed, or by having internal ballast 24, for instance of cast iron, which holds them on the cell bottom.

Advantageously, the layer 23 bonding the carbon wedges 20 to the carbon cell bottom 1 may consist of several layers of the slurry according to the invention applied to each of the surfaces which are applied together while the outer layers of the applied slurry are still tacky, and then dried. The preformed $TiB_2$ or other refractory boride from the slurry provides an excellent conductive bond, the dried slurry acting as a conductive glue.

These carbon wedges 20 have inclined side faces, for instance at an angle of about 45° to 10° to the vertical, meeting along a rounded top edge 21. The wedges 20 are placed side by side, spaced apart at their bottoms to allow for a shallow layer 8 of aluminium on the cell bottom 1. The cell bottom 1 can be coated with a protective aluminium-wettable coating 9 according to the invention. The edges 21 are all parallel to one another across or along the cell, and the tops of the prisms remain several centimeters below the top level of the electrolyte 7.

The inclined side faces of wedges 20, and possibly also the bottom face, are coated with a permanent aluminium-wettable coating 9 in accordance with the invention. These coatings 9, like that of the cell bottom 1, are applied from a slurry as before. In use, these coatings 9 on the sloping surfaces of wedges 20 form drained cathode surfaces from which cathodically produced aluminium drains permanently into the pool 8. Current is supplied to the wedges 20 via conductor bars (not shown, but like the bars 4 of FIG. 1) in the cell bottom 1.

Over the cathode-forming wedges 20 are fitted anodes 25, each formed by a pair of plates which fit like a roof over the wedges 20, parallel to the inclined surfaces of wedges 20 with a small anode-cathode distance of about 15–20 mm. At their tops, the pairs of anode plates 25 are joined together and connected to a positive current supply. The anode plates 25 have openings 26, for example adjacent the top of their inclined faces, for the escape of anodically-generated gas, usually oxygen. The anode plates 25 are made of or coated with any suitable non-consumable or substantially non-consumable electronically-conductive material resistant to the electrolyte and to the anode product of electrolysis, which in the case of the electrolysis of alumina utilizing non-carbon anodes, is oxygen. For example, the plates may have a metal, alloy or cermet substrate which is protected in use by a metal oxide layer and a cerium-oxyfluoride-based protective coating produced and/or maintained by maintaining a concentration of cerium in the electrolyte, as described in U.S. Pat. No. 4,614,569.

Alternatively, it is possible to employ consumable carbon anodes with wedge-shaped bottoms which dip between the cathode wedges 20, the anodes having inclined, consumable operative surfaces facing the inclined surfaces of two adjacent cathode-forming wedges 20, which are maintained with a substantially constant anode-cathode distance by lowering the anodes at a rate to compensate for their consumption.

These designs employing wedge-shaped cathodes have several advantages. As before, the permanent aluminium-wettable refractory surfaces on the cathodes protect the carbon from attack and the cell can be operated with a small anode-cathode distance ensuring efficient operation. In addition, the design permits a very high productivity per unit area of the cell floor, possibly 1.5 to 2.5 times as much as in a conventional cell.

It is also possible to use pieces of carbon coated in accordance with the invention with a permanent aluminium-wettable refractory surface, as other components in aluminium production cells in particular components which in use are exposed to molten aluminium, for instance weirs or baffles, side walls, etc., or as components in other molten salt electrolysis cells.

Figure 4:
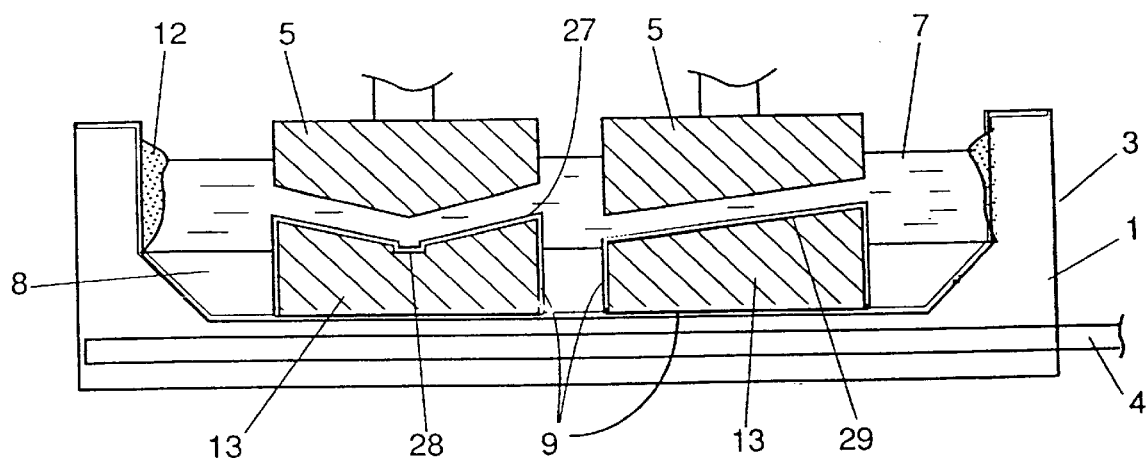
FIG. 4 schematically shows an aluminum production cell in which carbon cathodes with inclined upper faces and coated according to the invention have been secured on the cell bottom and cooperate with inclined anodes.

FIG. 4 shows a modification of the cell of the preceding Figures wherein cathode blocks 13 fixed in the cell bottom 1 have inclined upper faces coated with the aluminium-wettable refractory coating 9. The left-hand part of FIG. 4 shows blocks 13 with V-shaped faces 27 inclined down towards a central groove 28 in which the product aluminium collects. This groove 28 can be slightly inclined towards one end to facilitate the flow of molten aluminium into pool 8. Above the V-shaped surfaces 27 of blocks 13 are anodes 5 whose bottom surfaces have corresponding V-shaped surfaces, facing the surfaces 27 with a constant anode-cathode gap.

The right hand side of FIG. 4 shows cathode blocks 13 coated with the aluminium-wettable coating 9, these blocks having top surfaces 29 inclined to one side, and the anodes 5 have each a corresponding sloping lower face. In these embodiments, the sloping surfaces of the anodes 5 considerably improve gas release compared to conventional pre-baked anodes with a flat bottom. The improved gas release contributes to a better circulation of the electrolyte 7 and helps reduce the voltage across the cell.

Figure 5:
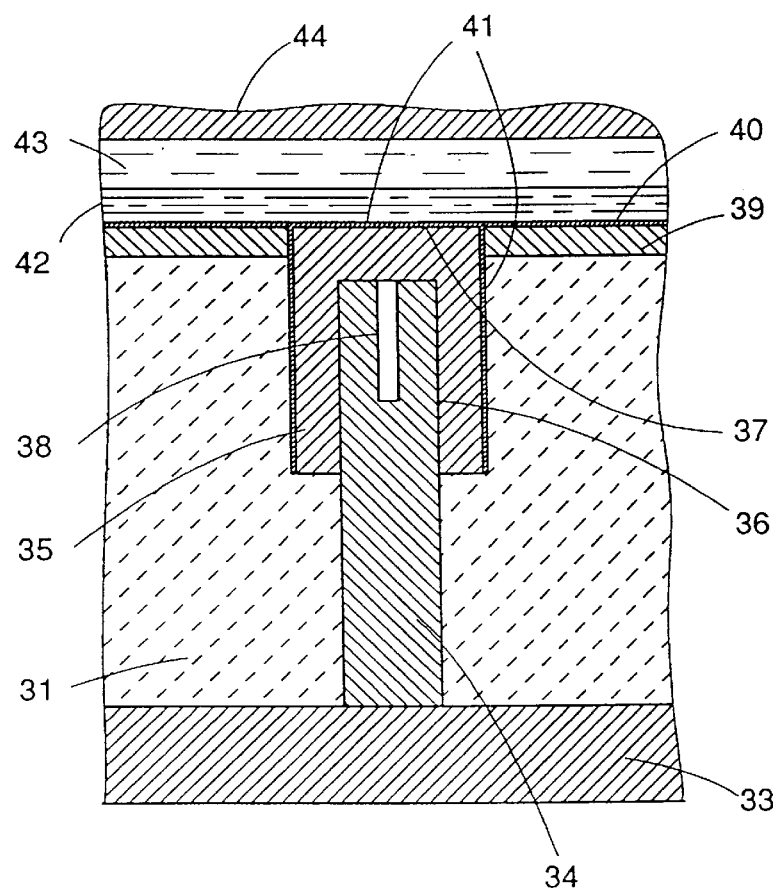
FIG. 5 is a sectional longitudinal view through part of an aluminum production cell having a coated carbon current collector in a coated refractory cell bottom.

FIG. 5 is a schematic representation of part of an aluminium reduction cell having a non-conductive cell bottom with a special bottom-entry current feeder arrangement.

The non-conductive cell bottom comprises an alumina potlining 31 contained in a steel shell 33 which is connected to external buswork. Extending vertically from the bottom of shell 33 at spaced locations are a number of steel posts 34 which terminate just below the top of potlining 31. At its top end, each post 34 is enclosed in a cap 35 of carbon. As shown in FIG. 1, the cap 35 consists of cylindrical body having a central bore 36 and a closed upper end 37. The post 34 fits loosely in the bore 36 and is secured therein by pouring in cast iron or conductive pitch by the well known rodding process, or by force fitting. Conveniently, the caps 35 are secured to the posts 34 which may then be welded to the bottom of shell 33. To allow for thermal expansion, the top end of post 34 has one or more slots 38. The circular top end 37 of cap 35 lies flush with a top layer 39 of the potlining 31. This top layer 39 may be tamped tabular alumina and is coated with a layer 40 aluminium-wettable refractory material. The top upper end 37 and the sides of the carbon cap 35 are coated with a layer 41 of aluminium-wettable refractory material, for instance including $TiB_2$ produced according to the invention. Maximum advantages are obtained when both the layer 40 of refractory material and the top of carbon cap 35 are both coated e.g. with $TiB_2$. These coatings can be applied separately or together by applying a slurry over the entire cell bottom including the carbon areas 37. However, the invention also forsees the possibility that only the carbon surfaces may be coated. By extending the coating 41 down the sides of the carbon cap 35, maximum protection against attack by aluminium or cryolite is obtained.

Atop the aluminium-wettable layers 40 and 41 is a layer of cathodic molten aluminium 42, which may be about 1–4 cm thick for an aluminium-wettable cell bottom surface. Above the cathodic aluminium 10 is a layer of electrolyte 43, typically molten cryolite containing dissolved alumina at a concentration well below saturation, into which anodes 44 dip. In operation, the electrolyte 43 may be at a temperature of about 900° C. or below.

The anodes 44 may be conventional prebaked carbon anodes (especially for deep pool operation) or oxygen-evolving non-consumable anodes (for shallow or deep pool operation). Preferred non-consumable anodes have an electrically conductive substrate coated with a protective surface layer based on cerium oxide-fluoride. Such surface layers can be preserved by including a concentration of cerium in the electrolyte 43, as mentioned beforehand and as described in U.S. Pat. No. 4,614,569.

The described embodiment corresponds to the retrofitting of an existing type of cell with a steel shell bottom 33, used for supplying current. Of course, an alumina-filled potlining can be employed with different cell base designs, for example having a solid aluminium base plate to which posts 34 of a suitable high-temperature aluminium alloy are welded. Such alloys should have a fusion point of about 1000° C. or in any event above the cell operating temperature.

Instead of being a cylindrical cap, the protective carbon member can advantageously be a slab or bar having a flat top face which extends across the cell. A slot can be provided in such a bar to receive a plate-like current-collector core. Alternatively, there can be several bores in the carbon to receive several current collector posts of corresponding shape. Also, especially for larger carbon current feeder posts or bars, it my be possible to dispense with the inner steel current supply bar.

The current feeders can also be made entirely of carbon cylinders or slabs embedded in carbon blocks from which cathode conductor bars extend to external negative busbars.

The coating 9 of the aluminium-wettable refractory material can also be used in other cell designs, for example where drained cathodes have vertical surfaces or are sloping at a small angle to vertical.

The invention will be further described in the following examples.

EXAMPLE I

A slurry was prepared from a dispersion of 10 g $TiB_2$, 99.5% pure, −325 mesh (<42 micrometer), in 25 ml of colloidal alumina containing about 20 weight % of solid alumina. Coatings with a thickness of 150±50 to 500±50 micrometer were applied to the faces of carbon blocks. Each layer of slurry was allowed to dry for several minutes before applying the next, followed by a final drying by baking in an oven at 100–150° C. for 30 minutes to 1 hour.

The above procedure was repeated varying the amount of $TiB_2$ in the slurry from 5 to 15 g and varying the amount of colloidal alumina from 10 ml to 40 ml. Coatings were applied as before. Drying in air took 10 to 60 minutes depending on the dilution of the slurry and the thickness of the coatings. In all cases, an adherent layer of $TiB_2$ was obtained.

EXAMPLE II

An anthracite-based cathode sample was coated with an adherent layer containing $TiB_2$ as follows.

A layer of pre-formed particulate $TiB_2$, 99.5% pure, was applied to an anthracite cathode sample in three coats using a solution of 25 g $TiB_2$ −325 mesh (<42 micrometer) in 10 ml of colloidal alumina containing about 20% of the colloid. Each coating had a thickness of 150±50 micrometer, and was dried for 10 minutes before applying the next coating. The sample was then finally dried in air at about 120° C. for about ½ hour to 1 hour.

The resulting coated anthracite cathode sample had an adherent coating of $TiB_2$. Microscopic analysis of a cut specimen revealed a $TiB_2$ layer adhering firmly to the anthracite substrate.

When tested as cathode in a laboratory aluminium production cell, the sample showed good wettability with molten aluminium and no sign of deterioration. The aluminium was found to penetrate the coating and remain there.

We claim:

1. A drained-cathode cell for the production of aluminium by the electrolysis of alumina dissolved in a molten electrolyte, the cell comprising at least one drained cathode and a facing anode spaced apart from the cathode in the electrolyte by an anode-cathode gap, said drained cathode having a drained cathode surface on which during operation aluminium is cathodically produced and from which the produced aluminium constantly drains, the drained cathode being formed by a body coated with an adherent aluminium-wettable coating of per formed refractory hard metal boride in a dried colloid, said coating being obtainable by non-reactive sintering or consolidation of the preformed particulate refractory hard metal boride in the dried colloid.

2. The cell of claim 1, wherein the cathode is made of carbon.

3. The cell of claim 1, comprising a cell bottom formed of a plurality of cathodes coated with said adherent aluminium-wettable coating of refractory material, said coating on the cell bottom forming the drained cathode surface.

4. The cell of claim 1, comprising a cell bottom over which the drained cathode is located so that the aluminium produced on the drained cathode surface drains onto the cell bottom.

5. The cell of claim 4, wherein the cell bottom is made of carbon and is also coated with an adherent aluminium-wettable coating.

6. The cell of claim 4, wherein the cathode bodies are blocks of carbon placed on or secured to the cell bottom.

7. The cell of claim 6, wherein the cathode blocks are secured to the cell bottom by a bonding layer or by mechanical means.

8. The cell of claim 6, wherein the cathode blocks are secured to the cell bottom by having bottom parts embedded in the cell bottom.

9. The cell of claim 6, wherein the cathode blocks placed on or secured to the cell bottom each have an upper surface which forms said drained surface, the produced aluminium which drains onto the cell bottom forming a pool whose level fluctuates from close to the cell bottom up to adjacent the drained cathode surface of the blocks.

10. The cell of claim 6, wherein the cathode bodies are blocks of carbon with internal inserts which act as heavy ballast so the blocks rest firmly on the cell bottom.

11. The cell of claim 4, wherein the drained cathode is suspended from the anode over the cell bottom by attachments of electrically non-conductive material resistant to the electrolyte, said attachments serving as spacers maintaining a desired anode-cathode gap.

12. The cell of claim 1, comprising at least one aluminium collection groove for the collection of the cathodically produced aluminium draining from the cathode surface(s) during operation.

13. The cell of claim 1, wherein the drained cathod has a horizontal drained cathode surface.

14. The cell of claim 1, wherein the drained cathode has an upright drained cathode surface.

15. The cell of claim 1, wherein the anodes and the drained cathode have inclined facing surfaces.

16. The cell of claim 15, wherein the cathode is prism or wedge-shaped, associated with an anode formed of a pair of plates of non-consumable or substantially non-consumable electronically conductive material resistant to the electrolyte, which anode plates fit like a roof over the wedge-shaped cathode parallel to its inclined surfaces.

17. The cell of claim 16, wherein the anode plates have openings adjacent the top of their inclined faces for the escape of anodically-generated gas.

18. The cell of claim 15, wherein the cathode has two oppositely inclined faces in V configuration and a central groove located at the bottom of the inclined faces for collecting during operation of the product aluminium.

19. The cell of claim 18, wherein the collection groove is a recessed groove located along and below the bottom of the V-shaped faces.

20. The cell of claim 19, wherein the recessed groove is inclined to facilitate evacuation of the collected molten aluminium.

21. The cell of claim 1, comprising side walls exposed to molten aluminium, the side walls being coated with an adherent coating of an aluminium-wettable refractory material extending at least to above the maximum level of aluminium.

22. The cell of claim 21, wherein a crust of solidified electrolyte is formed on the cell side walls, said side walls coating extending up to the crust.

23. The cell of claim 21, wherein the coating on the cell side walls extends all the way up the side walls.

24. The cell of claim 21, wherein a different coating is provided on the upper part of the side walls to protect from oxidation and fluoride fumes.

25. The cell of claim 1, wherein said dried colloid is selected from dried colloidal alumina, silica, yttria, ceria, thoria, zirconia, magnesia, lithia, monoaluminium phosphate and cerium acetate, and mixtures thereof.

26. The cell of claim 1, wherein said refractory hard metal boride is selected from borides of titanium, chromium, vanadium, zirconium, hafnium, niobium, tantalum, molybdenum and cerium, and combinations thereof.

27. The cell of claim 26, wherein said refractory hard metal boride is titanium dibdride and said dried colloid is colloidal alumina.

28. The cell of claim 1, wherein the drained cathode has an aluminised coating which is obtained by exposure to molten aluminium in the presence of a flux assisting penetration of aluminium into the refractory material prior to operation.

29. The cell of claim 1, wherein the drained cathode is exposed to molten electrolyte comprising molten cryolite.

30. The cell of claim 1, wherein the anode is a consumable carbon anode.

31. The cell of claim 1, wherein the anode is an oxygen-evolving non-consumable or substantially non-consumable anodes.

32. The cell of claim 31, wherein the anode comprises an electrically-conductive substrate coated with a protective surface layer based on cerium oxide-fluoride.

33. The cell of claim 1, which comprises a re-built cell bottom.

34. The cell of claim 1, which is a newly constructed cell.

35. The cell of claim 1, which is in a bipolar configuration comprising at least one bipolar electrode having on its cathode side said aluminium wettable drained surface.

36. A drained cathode for use in a cell, the drained cathode having at least one drained cathode surface coated with an adherent aluminium-wettable coating of refractory hard metal boride in a dried colloid as defined in claim 1.

37. The cathode of claim 36, wherein the drained cathode surface is inclined.

38. The cathode of claim 37, which is a prism or wedge-shaped body.

39. The cathode of claim 37, comprising two oppositely inclined faces in V configuration, leading down into a central groove for collection of the product aluminium.

40. The cathode of claim 39, wherein the collection groove is a recessed groove located along and below the bottom of the V-shaped faces.

41. The cathode of claim 40, wherein the recessed groove is inclined to facilitate evacuation of the collected molten aluminium.

* * * * *